(12) United States Patent
Hasler et al.

(10) Patent No.: US 6,935,681 B2
(45) Date of Patent: Aug. 30, 2005

(54) DEVICE FOR REINFORCING A HOLLOW ELEMENT OF A MOTOR VEHICLE

(75) Inventors: Thomas Hasler, Birmensdorf (CH); Lutz Zabel, Birmensdorf (CH)

(73) Assignee: Sika Schweiz AG (CH)

( * ) Notice: Subject to any disclaimer, the term of this patent is extended or adjusted under 35 U.S.C. 154(b) by 0 days.

(21) Appl. No.: 10/471,769

(22) PCT Filed: Jan. 9, 2002

(86) PCT No.: PCT/EP02/00120

§ 371 (c)(1),
(2), (4) Date: Feb. 27, 2004

(87) PCT Pub. No.: WO02/074608

PCT Pub. Date: Sep. 26, 2002

(65) Prior Publication Data

US 2004/0130185 A1 Jul. 8, 2004

(30) Foreign Application Priority Data

Mar. 16, 2001 (DE) ............................ 101 12 688

(51) Int. Cl.[7] .......................... B60R 21/02; B60J 7/00; B62D 29/00
(52) U.S. Cl. ............................................. 296/203.02
(58) Field of Search ................. 296/187.02, 187.12, 296/193.06, 203.03, 193.05; 52/731.6, 735.1; 264/46.4, 46.5, 46.6, 46.7; 138/153, 172, 174

(56) References Cited

U.S. PATENT DOCUMENTS

| | | | | |
|---|---|---|---|---|
| 5,398,989 A | * | 3/1995 | Winter et al. ......... | 296/203.03 |
| 5,806,915 A | * | 9/1998 | Takabatake ........... | 296/187.02 |
| 5,927,786 A | * | 7/1999 | Kawai et al. .......... | 296/39.1 |
| 6,058,673 A | * | 5/2000 | Wycech ................ | 52/721.4 |
| 6,092,864 A | * | 7/2000 | Wycech et al. ....... | 296/204 |
| 6,165,588 A | * | 12/2000 | Wycech ................ | 428/122 |
| 6,189,953 B1 | | 2/2001 | Wycech ................ | 296/187.02 |
| 6,247,287 B1 | | 6/2001 | Takabatake ........... | 52/731.6 |
| 6,305,430 B1 | | 10/2001 | Ishikawa .............. | 138/174 |
| 6,357,819 B1 | * | 3/2002 | Yoshino ............... | 296/187.02 |
| 6,443,511 B2 | * | 9/2002 | Braun .................. | 293/120 |
| 6,467,834 B1 | * | 10/2002 | Barz et al. ............ | 296/187.02 |
| 6,471,285 B1 | * | 10/2002 | Czaplicki et al. ..... | 296/187.02 |
| 6,478,367 B2 | * | 11/2002 | Ishikawa .............. | 296/203.03 |
| 6,494,525 B1 | * | 12/2002 | Blank .................. | 296/187.02 |
| 6,607,239 B1 | * | 8/2003 | Fuji .................... | 296/203.03 |
| 6,786,533 B2 | * | 9/2004 | Bock et al. ........... | 296/187.02 |
| 2001/0020794 A1 | | 9/2001 | Ishikawa .............. | 296/187.02 |
| 2001/0042353 A1 | * | 11/2001 | Honda et al. ......... | 52/731.6 |
| 2002/0027379 A1 | * | 3/2002 | Czaplicki ............. | 296/188 |
| 2002/0033617 A1 | * | 3/2002 | Blank .................. | 296/187 |
| 2003/0090129 A1 | * | 5/2003 | Riley et al. .......... | 296/203.03 |
| 2004/0130185 A1 | * | 7/2004 | Hasler et al. ........ | 296/193.06 |

OTHER PUBLICATIONS

Translation of International Preliminary Examination Report for PCT/EP02/00120.

* cited by examiner

*Primary Examiner*—Lori L. Coletta
(74) *Attorney, Agent, or Firm*—Bingham McCutchen LLP

(57) ABSTRACT

The invention relates to a device for reinforcing a hollow element (16) of a motor vehicle, especially a column of the body. The inventive device consists of at least one elongate, dimensionally stable plastic support frame (10) insertable into the hollow element (16) which is provided with free supporting surfaces (18) that can be engaged gaged with the inner wall (32) of the hollow element (16).

25 Claims, 6 Drawing Sheets

DEVICE FOR REINFORCING A HOLLOW ELEMENT OF A MOTOR VEHICLE

Figure 1:
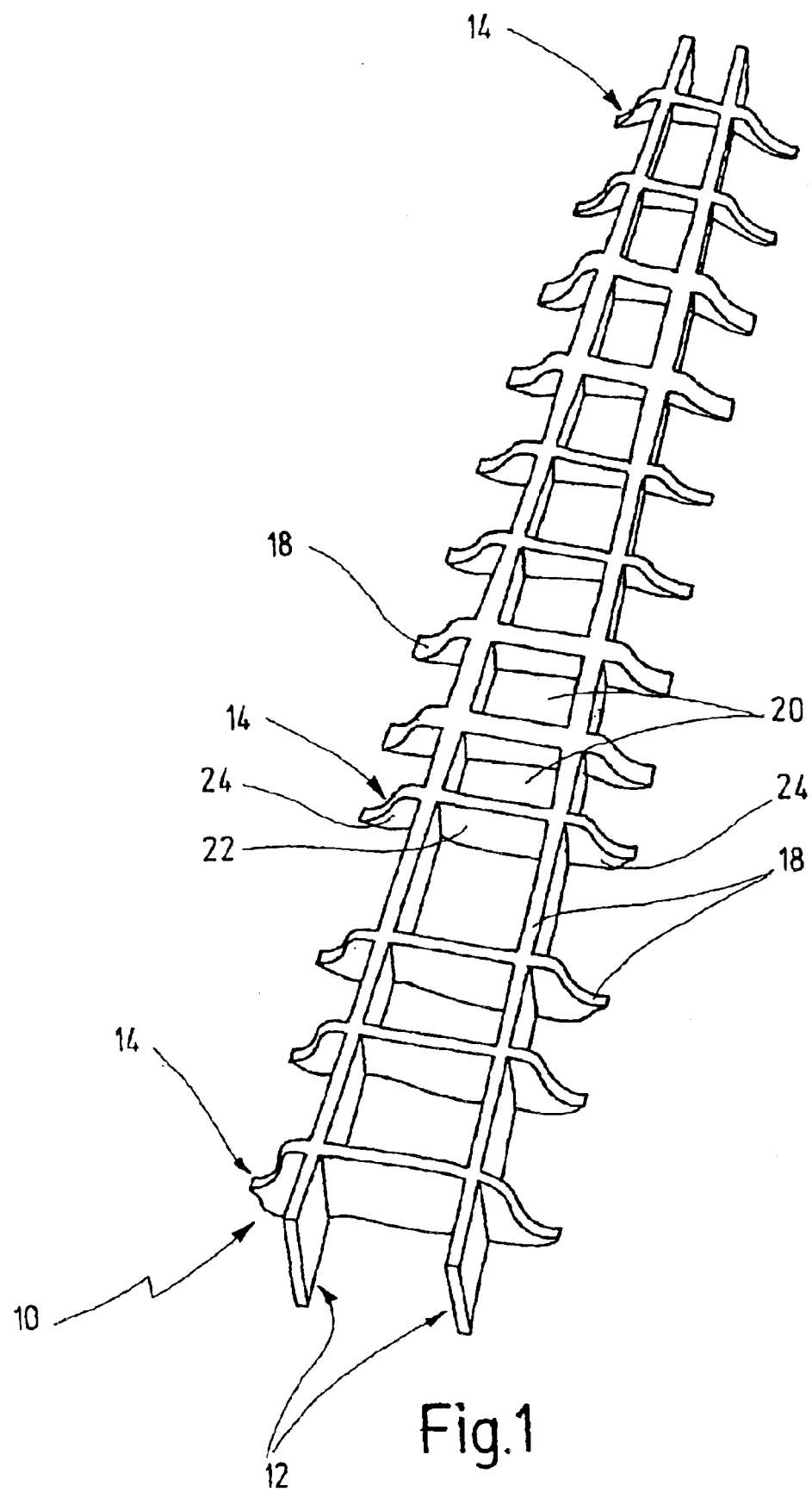

The invention relates to a device for reinforcing a hollow element of a vehicle, in particular a vehicle-body pillar.

For this purpose, in automobile building, reinforcing parts are known as a composite body comprising a geometrically simple load-bearing structure and a foamable material. The load-bearing structure serves primarily to retain and place the foamable material in a hollow part without any special contour adaptation. Next, the hollow part is filled with foam to its full volume, and the expanded foam material provides the connection to the wall and thus the absorption of force and distribution of load. The reinforcement effect is thus definitively based on the material properties of the foam. It has proven disadvantageous in this respect that the foaming process requires a chemical reaction that must be adapted to the production process of the vehicle, particularly in terms of the incident temperatures. The reinforcement function thus depends on accurate and constant adherence to the process parameters. Another disadvantage is that the structural parts can no longer be disconnected from one another easily, making recycling more difficult. In addition, completely filling the space with foam brings about a more or less homogeneous reinforcement effect, without the ability to take three-dimensional varying design requirements into account.

With this as the background, it is the object of the invention to overcome the aforementioned disadvantages and to create a hollow element reinforcement which is simple to produce and simple to use, can be designed variably to suit specific stresses, makes weight reduction possible, and presents no particular problems of disposal.

For attaining this object, the combination of characteristics recited in claim 1 is proposed. Advantageous features and refinements of the invention will become apparent from the dependent claims.

The invention is based on the concept of creating a reinforcing body as a lightweight component that is free of load-bearing foam parts. Hence according to the invention, an elongated, dimensionally stable supporting skeleton of plastic is proposed which is insertable into the hollow element and has free support faces that can be brought into engagement with the inner wall of the hollow element. With extensive weight reduction, the plastic skeleton structure makes geometrically complex shaping and a three-dimensionally adapted reinforcement behavior feasible; the outer support faces allow a load to be absorbed directly. The supporting skeleton has a defined function, because of its predetermined structure. Its assembly can be incorporated, without particular effort or expense, into the existing production sequence of the vehicle, and simple disconnection into pure types of material is possible for the sake of disposal.

Advantageously, the supporting skeleton has an envelope contour corresponding to the inside shape of the hollow element.

An optimal design is made possible because the supporting skeleton is embodied as an integral molded part, preferably as an injection-molded part. In terms of the dimensional stability in production and use of the vehicle, it is advantageous if the supporting skeleton comprises a heat-resistant plastic, preferably polyphenyl sulfide in the form of high-performance plastic, or polyamide.

A structurally advantageous design provides that the supporting skeleton has, distributed over its length, a plurality of bracing ribs extending transversely to its longitudinal direction. The intent is to assure that the bracing ribs each span an internal cross section, preferably over the full area thereof, of the hollow part, in order to achieve optimal bracing. A further advantage in this respect is obtained because the bracing ribs are kept spaced apart from one another via longitudinal struts of the supporting skeleton. In this respect it is favorable if the supporting skeleton has at least one and preferably two longitudinal struts that are continuous in its longitudinal direction and transversely penetrate the bracing ribs.

To optimize the introduction of force, it is advantageous if the peripheral edges of the bracing ribs and optionally the longitudinal struts are adapted, as support faces, to the contour of the inner wall of the hollow element.

A further advantageous feature of the invention provides that the structural strength of the supporting skeleton is adapted or modeled in accordance with the specification of a three-dimensionally variable operative stiffness and/or crash stress. This can be achieved, in accordance with the desired deformation behavior, by providing that the wall thickness, the mutual spacing, and/or the orientation of the bracing ribs and/or longitudinal struts varies over the supporting skeleton.

For structurally optimized weight reduction, it is advantageous if the supporting skeleton has a plurality of hollow chambers, which are separated from one another in the longitudinal direction of the supporting skeleton by the bracing ribs and are open in a transverse direction.

Advantageously, the bracing ribs have shoulder portions protruding to the outside laterally past the longitudinal struts.

A further advantageous version provides that the supporting skeleton has recesses for functional parts, such as belt rollers, that are integrated with the hollow element.

For direct force introduction and bracing, the supporting skeleton can rest by positive engagement at its support faces against the inner wall of the hollow element. To further improve the operative stiffness, it is favorable if the supporting skeleton can be brought into nonpositive and/or material engagement with the inner wall of the hollow element via connecting means that are preferably applied in layers to its support faces, to which end an adhesive or an adhesive foam that is activatable by the action of heat is advantageous. In addition or as an alternative, the supporting skeleton can be fixed in the hollow element via separate mechanical connecting means.

An additional function is attained by providing that foamable parts are disposed on the supporting skeleton for sealing off or partitioning off a cross section of the hollow element.

Figure 8:
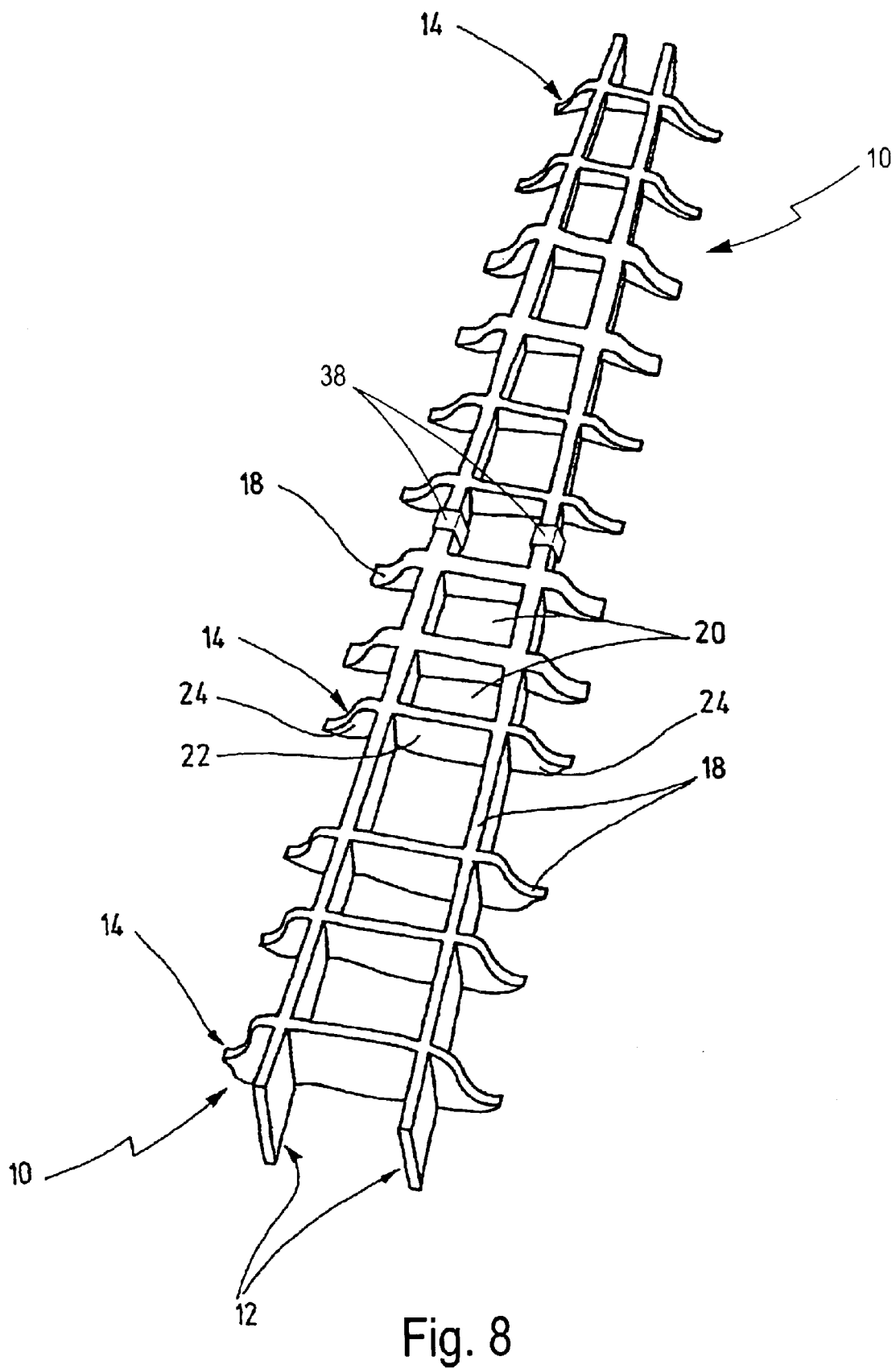

With relatively long hollow parts, a plurality of supporting skeletons can be disposed in line with one another, as shown in FIG. 8, to avoid tolerance problems. Optionally, the supporting skeletons can be coupled to one another at the ends, preferably via plug-in or articulated connections 38.

A further aspect of the invention relates to a structural part of a vehicle, comprising a hollow element and at least one supporting skeleton, inserted into it, in accordance with the invention.

Figure 2:
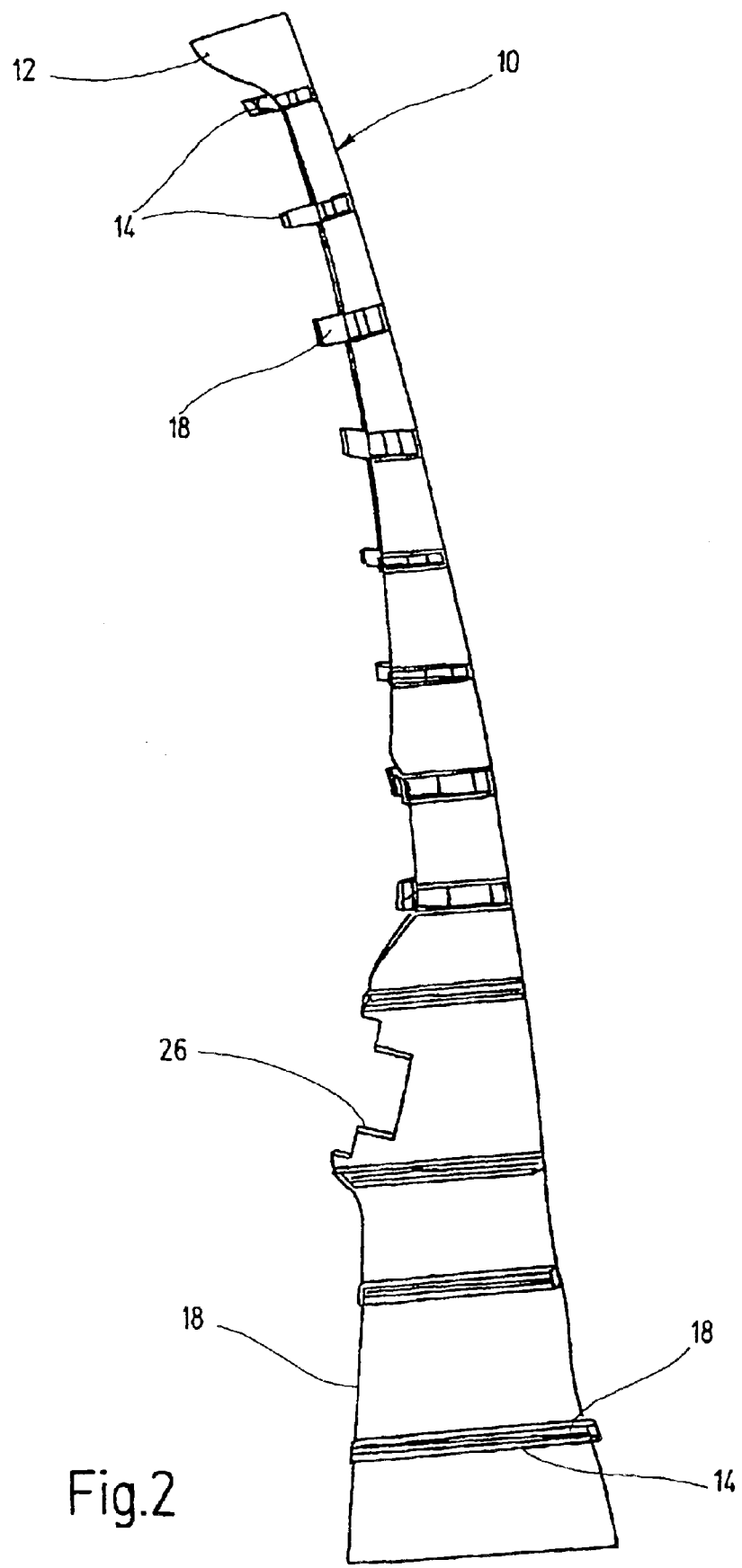
Figure 3:
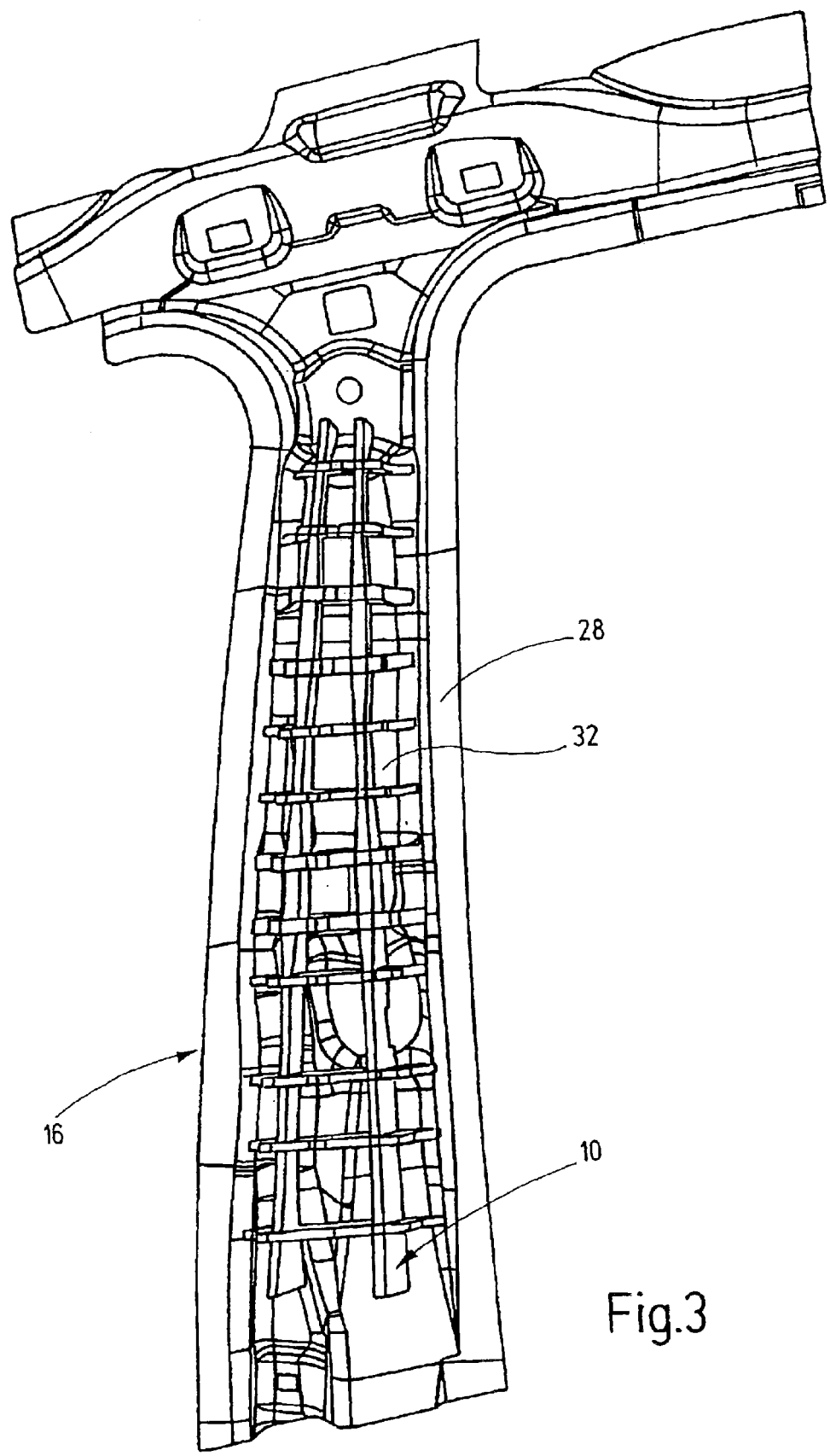
Figure 4:
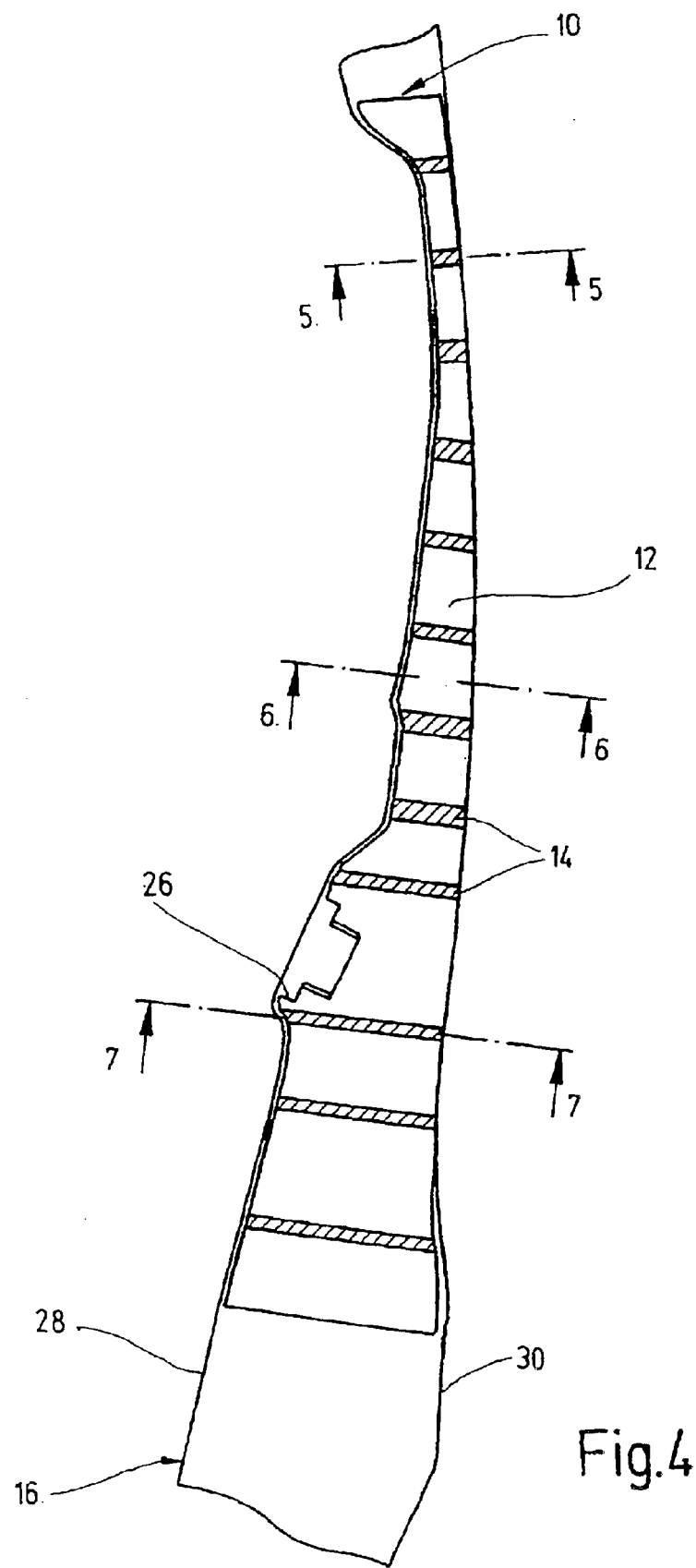
Figure 5:
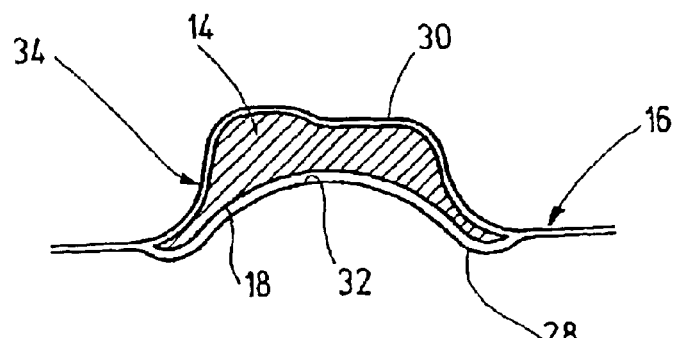
Figure 6:
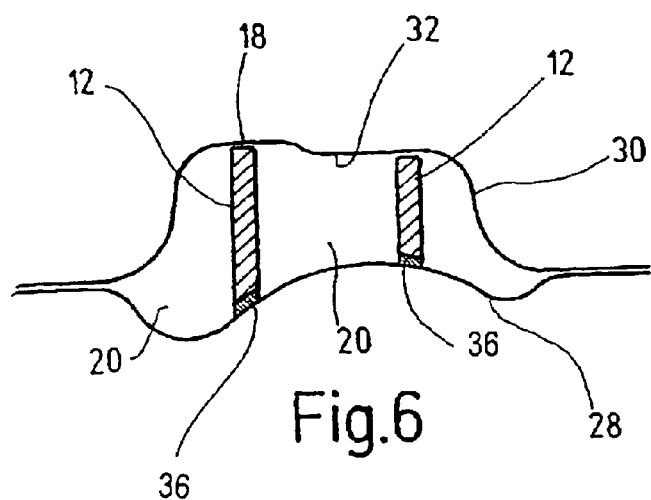
Figure 7:
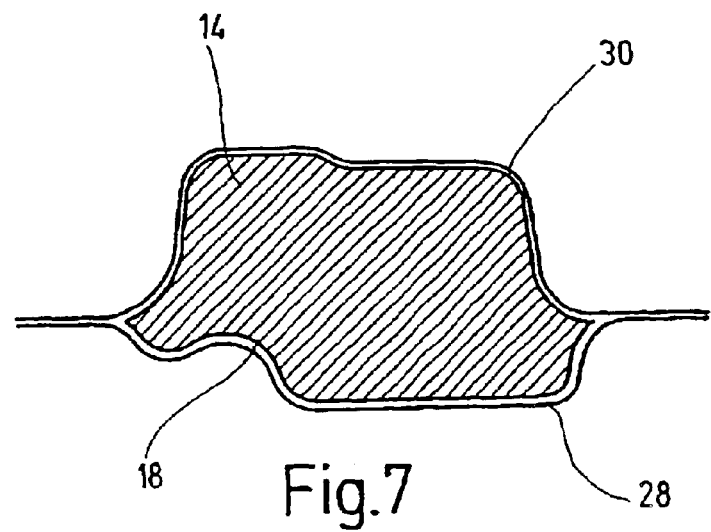

The invention is described in further detail below in terms of an exemplary embodiment shown schematically in the drawings. Shown are FIG. 1, a perspective view of a supporting skeleton for insertion into a B pillar of a motor vehicle;

FIG. 2, a side view of the supporting skeleton of FIG. 1;

FIG. 3, a perspective view of the supporting skeleton, inserted with positive engagement into the B pillar;

FIG. 4, a vertical section through the inner wall, shown cut away, of the B pillar and the supporting skeleton inserted into it;

FIGS. 5–7, a section along the correspondingly numbered section lines in FIG. 4; and FIG. 8, a perspective view of two supporting skeletons coupled together.

The elongated supporting skeleton 10 shown in FIG. 1, as a plastic integral molded part, comprises two longitudinal struts 12, extending parallel to one another in the longitudinal direction of the skeleton, and a plurality of bracing ribs 14 extending transversely to the longitudinal struts and laterally spaced apart from one another. The enveloping contour spanned by the supporting skeleton 10 corresponds to the internal shape of the B pillar 16 or in general a hollow part of a vehicle, the vehicle not being shown separately. In the inserted state, the supporting skeleton 10 thus makes a structural reinforcement possible, and in particular a bracing that is adapted to the load requirements.

For this purpose, the bracing ribs 14 and the longitudinal struts 12, with their edges, form outward-pointing free support faces or support edges 18, which can be brought into pointwise or linear engagement with the hollow part on the inside. To meet spatially varying demands for strength of the supporting skeleton 10, the wall thickness and the mutual spacing of at least the bracing ribs 14 are adapted accordingly, or in other words are embodied differently at intervals over the supporting skeleton. The structural design is in accordance with computer or experimental analysis of the operative and crash stress features of the vehicle.

The supporting skeleton 10 of lightweight construction has many hollow chambers 20, which are disposed in lines in the longitudinal direction of the skeleton and are open transversely to it, and which are separated from one another in trestle fashion by the bracing ribs 14 and the longitudinal struts 12. To be able to span even complex hollow chamber cross sections over the full area, the bracing ribs 14 have central portions 22 that extend between respective longitudinal struts 12 and also have shoulder portions 24 that project laterally past the longitudinal struts 12. For receiving functional parts integrated with the hollow element, such as a belt roller, not shown, the supporting skeleton 10 is provided with suitable recesses 26 (FIG. 2).

As best seen from FIG. 3, the supporting skeleton 10 can be inserted into the sheet-metal part 28, which is of complementary shape and open toward the outside, of the B pillar 16. Optionally, mechanical fastening means, not shown, can be provided for additional fixation. In the course of further vehicle assembly, the B pillar is closed with an outer sheet-metal part 30, thereby enclosing the supporting skeleton 10. The sheet-metal parts 28, 30 form the geometrically complex shaped inner wall 32 of the B pillar 16 (FIG. 4).

FIGS. 5–7 show cross sections at various levels through the structural part 34 formed of the sheet-metal parts 28, 30 and the supporting skeleton 10 disposed in them. The bracing ribs 14, with their supporting edges 18, make bracing all the way around possible over the respective cross sectional contour of the inner wall 32, while the supporting edges 18 of the longitudinal struts 12 follow the longitudinal contour of the hollow element 16. In this way, even creasing and compression stresses that occur at points can be absorbed and dissipated over greater supporting widths along the supporting skeleton 10.

In principle, it is possible for the supporting skeleton 10 to be joined by nonpositive and/or material engagement to the inner wall 32 via mechanical or adhesive connecting means that are expediently applied, in particular at some places to the supporting edges 18 of the skeleton. For that purpose, as shown in FIG. 5, a material 36 that is a separate mechanical connecting means or is capable of foaming under the action of heat can be provided, such as a polyethylene-based foam. As a result, any tolerances and thermal expansions that occur can be compensated for, and a secure, rattle-free connection can be achieved. The foaming is advantageously done during subsequent heating of the vehicle body, for instance in the cataphoretic coating process. It is understood that it must be assured that the supporting skeleton 10 comprise a suitable temperature-resistant material to withstand the incident temperatures of approximately 150 to 190° C. of that process.

Supporting skeletons of the type described above can preferably be used in vehicle pillars, but can also be used in frame parts, roof struts, motor supports, or chassis parts of motor vehicles without significant effort or expense of assembly, for achieving highly effective, low-weight reinforcement. The structural design can suit locally variable requirements for strength, which proves advantageous particularly for hollow elements of the kind that for the sake of reducing weight are made of sheet-metal parts of varying wall thickness.

What is claimed is:

1. A device for reinforcing a hollow element of a vehicle, comprising at least one elongated, dimensionally stable supporting skeleton of plastic, which is insertable into the hollow element and has free support faces that can be brought into engagement with the inner wall of the hollow element, wherein the supporting skeleton is embodied as an integral molded part and has, distributed over its length, a plurality of bracing ribs extending transversely to its longitudinal direction, which are kept spaced apart from one another via at least one longitudinal strut in the supporting skeleton, whereby the longitudinal strut(s) run(s) in the longitudinal direction of the hollow element and whereby the bracing ribs each span an internal cross section over the full area of the hollow element and whereby the peripheral edges of the bracing ribs are adapted as support faces to the contour of the inner wall of the hollow element.

2. The device of claim 1, wherein the supporting skeleton has an envelope contour corresponding to the inside shape of the hollow element.

3. The device of claim 1, wherein the supporting skeleton is embodied as an injection-molded part.

4. The device of claim 1, wherein the supporting skeleton comprises a heat-resistant plastic.

5. The device of claim 1, wherein the longitudinal strut(s) is (are) continuous in the longitudinal direction and transversely penetrate the bracing ribs.

6. The device of claim 1, wherein the peripheral edges of the longitudinal struts are adapted, as support faces, to the contour of the inner wall of the hollow element.

7. The device of claim 1, wherein the structural strength of the supporting skeleton is adapted in accordance with the specification of a three-dimensionally variable operative stiffness or crash stress or both operative stiffness and crash stress.

8. The device of claim 1, wherein one or more of the wall thickness, the mutual spacing, or the orientation of either the bracing ribs or the longitudinal struts or both bracing ribs and longitudinal struts varies over the supporting skeleton (10).

9. The device of claim 1, wherein the supporting skeleton has a plurality of hollow through chambers, which are separated from one another in the longitudinal direction of the supporting skeleton by the bracing ribs and are open in a transverse direction.

10. The device of claim 1, wherein the bracing ribs have shoulder portions protruding to the outside laterally past the longitudinal struts.

11. The device of claim 1, wherein the supporting skeleton has recesses for functional parts that are integrated with the hollow element.

12. The device of claim 1, wherein the supporting skeleton rests by positive engagement at its support faces against the inner wall of the hollow element.

13. The device of claim 1, wherein the supporting skeleton can be brought into nonpositive or material engagement with the inner wall of the hollow element via connecting means optionally applied in layers to support faces of the supporting skeleton.

14. The device of claim 13, wherein an adhesive or an adhesive foam is provided as the connecting means.

15. The device of claim 14, wherein the adhesive foam is activatable by the action of heat.

16. The device of claim 1, wherein the supporting skeleton is fixable in the hollow element (16) via separate mechanical connecting means.

17. The device of claim 1, wherein foamable parts are disposed on the supporting skeleton for sealing off or partitioning off a cross section of the hollow element.

18. The device of claim 1, wherein a plurality of supporting skeletons are distributed over the length of the hollow element.

19. The device of claim 18, wherein the supporting skeletons are coupled to one another at the ends.

20. The device of claim 1, wherein the hollow element is a structural part of a vehicle.

21. The device of claim 11, wherein the functional part is a belt roller.

22. The device of claim 4, wherein the heat-resistant plastic is a polyphenyl sulfide.

23. The device of claim 5, wherein the supporting skeleton has two longitudinal struts.

24. The device of claim 19, wherein the supporting skeletons are coupled to one another at the ends via plug-in or articulated connections.

25. The device of claim 20, wherein the structural part is a vehicle body pillar.

* * * * *